(12) United States Patent
Fernandez et al.

(10) Patent No.: US 7,857,191 B2
(45) Date of Patent: Dec. 28, 2010

(54) FRICTION STIR WELDING (FSW) METHODS AND SYSTEMS AND FRICTION STIR WELDED COMPONENTS MADE THEREBY

(75) Inventors: Fernando Ferreira Fernandez, São José dos Campos (BR); Marcio Cruz, São José dos Campos (BR)

(73) Assignee: Embraer-Empresa Brasileira De Aeronautica S.A., Sao Jose Dos Campos-SP (BR)

( * ) Notice: Subject to any disclaimer, the term of this patent is extended or adjusted under 35 U.S.C. 154(b) by 42 days.

(21) Appl. No.: 12/140,234

(22) Filed: Jun. 16, 2008

(65) Prior Publication Data

US 2009/0311549 A1    Dec. 17, 2009

(51) Int. Cl.
B23K 20/12      (2006.01)
B23K 37/00      (2006.01)

(52) U.S. Cl. .................................... 228/112.1; 228/2.1
(58) Field of Classification Search ........................ None
See application file for complete search history.

(56) References Cited

U.S. PATENT DOCUMENTS

| 6,068,178 | A * | 5/2000 | Michisaka | 228/112.1 |
| 6,105,902 | A * | 8/2000 | Pettit | 244/119 |
| 6,622,904 | B2 * | 9/2003 | Ezumi et al. | 228/112.1 |
| 6,676,008 | B1 * | 1/2004 | Trapp et al. | 228/112.1 |
| 7,225,966 | B2 | 6/2007 | Christner | |
| 7,240,821 | B2 | 7/2007 | Talwar | |
| 2004/0050907 | A1 * | 3/2004 | Dracup et al. | 228/112.1 |
| 2004/0134971 | A1 * | 7/2004 | Narita et al. | 228/112.1 |
| 2005/0210820 | A1 * | 9/2005 | Tanaka et al. | 52/730.6 |
| 2007/0138236 | A1 * | 6/2007 | Agarwal et al. | 228/112.1 |
| 2007/0266536 | A1 * | 11/2007 | Burton et al. | 29/428 |

(Continued)

FOREIGN PATENT DOCUMENTS

JP     11047959 A   *   2/1999

(Continued)

OTHER PUBLICATIONS

Machine translation of JP-2003001440A.*

*Primary Examiner*—Kiley Stoner
(74) *Attorney, Agent, or Firm*—Nixon & Vanderhye P.C.

(57) ABSTRACT

Friction stir welding (FSW) processes, systems and the resulting friction stir welded components are disclosed whereby first and second workpieces are welded to one another using a first workpiece having mutually orthogonal structural components and a junction region therebetween which defines a bearing surface of predetermined geometry. A shoulder of a FSW tool may be brought into bearing contact with the bearing surface so that a pin extending from the shoulder of the FSW tool may be advanced into and through the one structural component of the first workpiece at an angle relative thereto so as to thereby form a friction stir weld region between the first and second workpieces. Some preferred embodiments will provide a bearing surface which defines an arcuately concave geometry, in which case the shoulder of the FSW tool defines an arcuately convex geometry conformably mateable with the bearing surface. According to other preferred embodiments, the bearing surface defines an arcuately convex geometry, in which case the shoulder of the FSW tool defines an arcuately concave geometry conformably mateable with the bearing surface. According to yet other preferred embodiments, the bearing surface and the shoulder of the FSW tool are each planar.

20 Claims, 6 Drawing Sheets

U.S. PATENT DOCUMENTS

2008/0202066 A1* 8/2008 Arsene et al. ............ 52/793.11
2008/0296433 A1* 12/2008 Brenner et al. ............ 244/129.1
2009/0200423 A1* 8/2009 Tucker .................... 244/123.1
2009/0266936 A1* 10/2009 Fernandez et al. .......... 244/119

FOREIGN PATENT DOCUMENTS

JP          2002096184 A  *  4/2002
JP          2003001440 A  *  1/2003

* cited by examiner

FRICTION STIR WELDING (FSW) METHODS AND SYSTEMS AND FRICTION STIR WELDED COMPONENTS MADE THEREBY

FIELD OF THE INVENTION

The embodiments disclosed herein relate generally to welding methods and systems, particularly friction stir welding (FSW) methods and systems employed to weld two metallic workpieces one to another, and to the resulting welded workpieces made thereby.

BACKGROUND OF THE INVENTION

Friction stir welding (FSW) is commonly used to weld two or more work pieces formed of various metals, such as aluminum, magnesium, copper, titanium, steel and the like, one to another. FSW techniques may be employed satisfactorily to form welded lap joint, L-joint and/or T-joint.

During conventional FSW processes (including continuous and segmented friction stir welding), a FSW tool having a specific geometry is forced into, and traversed through the material to be welded. The key structural components of the tool include a shoulder and pin (sometimes called a "probe" in art parlance) extending outwardly from the shoulder. During the FSW process, the pin travels physically in and through the material along a joint line, while the shoulder is in surface contact with the material. Heat is generated by the tool shoulder by virtue frictional rubbing on the material surface it is in contact with and by virtue of the pin mixing the molten material below the shoulder. This mixing action of the molten material during the FSW process permits the material to be transferred across the joint line which forms a stirred region. Process variables affecting the FSW process may include rotation and travel speeds, tool design, orientation, position and tool forging load.

On prior FSW technique proposed in U.S. Pat. No. 7,225,966 (the entire content of which is expressly incorporated hereinto by reference) including forming an aircraft component with a weld joint by application of a sealant layer to the surfaces to be joined. Such sealant is then cured in place by the elevated temperatures resulting from the FSW process.

U.S. Pat. No. 7,240,821 refers to a method for weldbonding at least two work-pieces wherein an adhesive is applied to a first surface of a first work-piece which is then brought into contact with a surface of a second work-piece. The first and second work-pieces are then friction stir or friction stir spot welded together which cures the adhesive. According to the technique in the '821 patent, the use of bonding tools to maintain the two work-pieces together during curing of the adhesive is eliminated.

In the prior art FSW techniques, however, a relatively small-sized weld region (sometimes referred to as a "weld nugget" in art parlance) is obtained having gaps on both sides of thereof. This occurs due to the fact that the tool shoulder must be in intimate contact the upper region of one of the workpieces and the existence of an orthogonal plane associated with such workpiece and also due the physical characteristics of the tool and its required movements in order to achieve the weld nugget. As such, conventional FSW processes are limited to providing weld regions at only certain locations relative to the workpieces to be joined, for example, typically at a center flange portion associated with the upper workpiece.

It would therefore be desirable if larger sized weld regions could be formed by means of FSW processes so as to allow for greater welding between workpieces than can be achieved by conventional FSW processes. It would also be highly desirable if a substantial part of one of the workpieces could be eliminated thereby providing substantial weight savings for applications in which component weight is a significant factor (e.g., as in the fabrication of aircraft components). It is towards fulfilling such needs that the present invention is directed.

SUMMARY OF THE INVENTION

Broadly the present invention is embodied in FSW processes, systems and the resulting friction stir welded components obtained thereby which allows for a larger sized weld region to be formed between welded workpieces. According to some embodiments of the present invention, methods for welding first and second workpieces to one another by friction stir welding (FSW) are provided which use a first workpiece having mutually orthogonal structural components and a junction region therebetween which defines a bearing surface of predetermined geometry. One of the planar structural components of the first workpiece may be brought into adjacent contact with a surface of a second workpiece so that the first and second workpieces may be welded to one another. Welding is advantageously practiced by bringing a shoulder of the FSW tool into bearing contact with the bearing surface at the junction region between the mutually orthogonal structural components of the first workpiece and advancing a pin extending from the shoulder of the FSW tool into and through the one structural component of the first workpiece to thereby form a friction stir weld region between the first and second workpieces. In especially preferred embodiments, the mateable geometries between the shoulder and the bearing surface are such that the FSW tool is oriented at an angle (e.g., higher than 0° and less than 90°) relative to a plane established by the one planar structural component of the first workpiece.

Some preferred embodiments of the invention will provide a bearing surface which defines an arcuately concave geometry, in which case the shoulder of the FSW tool defines an arcuately convex geometry conformably mateable with the bearing surface. According to other preferred embodiments, the bearing surface defines an arcuately convex geometry, in which case the shoulder of the FSW tool defines an arcuately concave geometry conformably mateable with the bearing surface. According to yet other preferred embodiments, the bearing surface and the shoulder of the FSW tool are each planar.

An adhesive bead or an interface sealant which contacts at least one lateral edge of the first workpiece and a corresponding portion of the second workpiece may also optionally be provided. In some embodiments, adhesive beads or an interface sealant will be provided which contact opposed lateral edges of the first workpieces and corresponding portions of the second workpiece.

The first workpiece may advantageously be selected from Z-beam, I-beam, C-beam, L-beam, U-beam, "omega"-beam and inverted T-beam members.

Other embodiments of this invention include a friction stir welding (FSW) system comprising first and second workpieces, wherein the first workpiece has mutually orthogonal structural components and a junction region therebetween which defines a bearing surface of predetermined geometry, and wherein one of the structural components of the first workpiece is adapted for adjacent contact with the second workpiece to allow for welding therebetween. A FSW tool is provided having a shoulder which is conformably geometrically mateable with the bearing surface, and a pin extending from the shoulder of the FSW tool. The shoulder of the FSW tool may be brought into bearing contact with the bearing surface at the junction region between the mutually orthogonal structural components of the first workpiece so that the pin extending therefrom may be advanced into and through the one structural component of the first workpiece to thereby form a friction stir weld region between the first and second workpieces. In especially preferred embodiments, the mateable shoulder of the FSW tool and the bearing surface allow for orientation of the pin at an angle relative to a plane established by the one structural component of the first workpiece.

According to further embodiments of this invention first and second welded workpieces may be provided, wherein the first workpiece has mutually orthogonal structural components and a junction region therebetween which defines a bearing surface of predetermined geometry, and wherein one of the structural components of the first workpiece is in adjacent contact with the second workpiece. The first and second welded workpieces include a friction stir weld region to weld one structural component of the first workpiece to an adjacent portion of the second workpiece in such a manner that the weld region encompasses the junction region between the mutually orthogonal structural components of the first workpiece. Structural panels which comprises such welded first and second workpieces may therefore be provided which are advantageously employed as an aircraft component, e.g., at least one of an aircraft's fuselage, empennage and wing.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
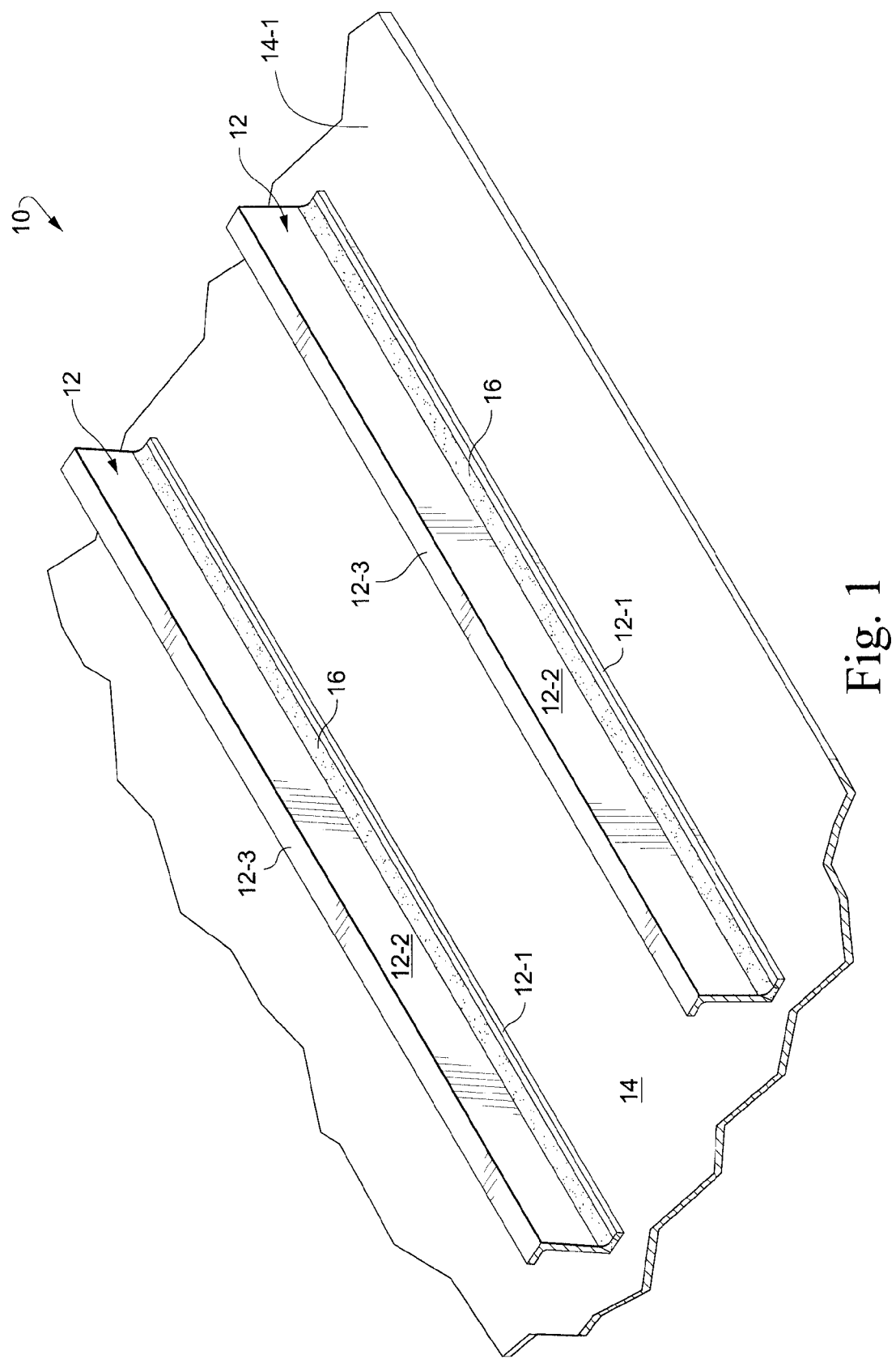
FIG. 1 is a schematic perspective view of a structural member that includes workpieces that have been welded to one another by an embodiment of this invention.

Accompanying FIG. 1 depicts a portion of a panel 10 that includes first workpieces 12 joined to a second workpiece 14 by means of a continuous friction stir weld region 16. Although the friction stir weld region 16 is depicted as a continuous region, it may also be a discontinuous (e.g., spot) weld region without departing from the present invention. Simply stated, the particular type of weld regions that may be formed employing the embodiments of the present invention is within the skill of those in this art depending on the end use applications for the structural components being fabricated, the materials of construction and other factors.

The structural panel 10 may be, for example, a panel associated with an aircraft structure (e.g., a component panel of an aircraft's fuselage, empennage, wing, or the like) in which each of the first workpieces 12 may be a "stringer" component and the second workpiece 14 may be a "skin" component. The panel 10 is of course exemplary to the various embodiments discussed below. Thus, while the present invention finds particular utility in fabricating aircraft components, it may be used equivalently for fabricating structural components in other fields, like automobile, naval and any others.

Figure 2A:
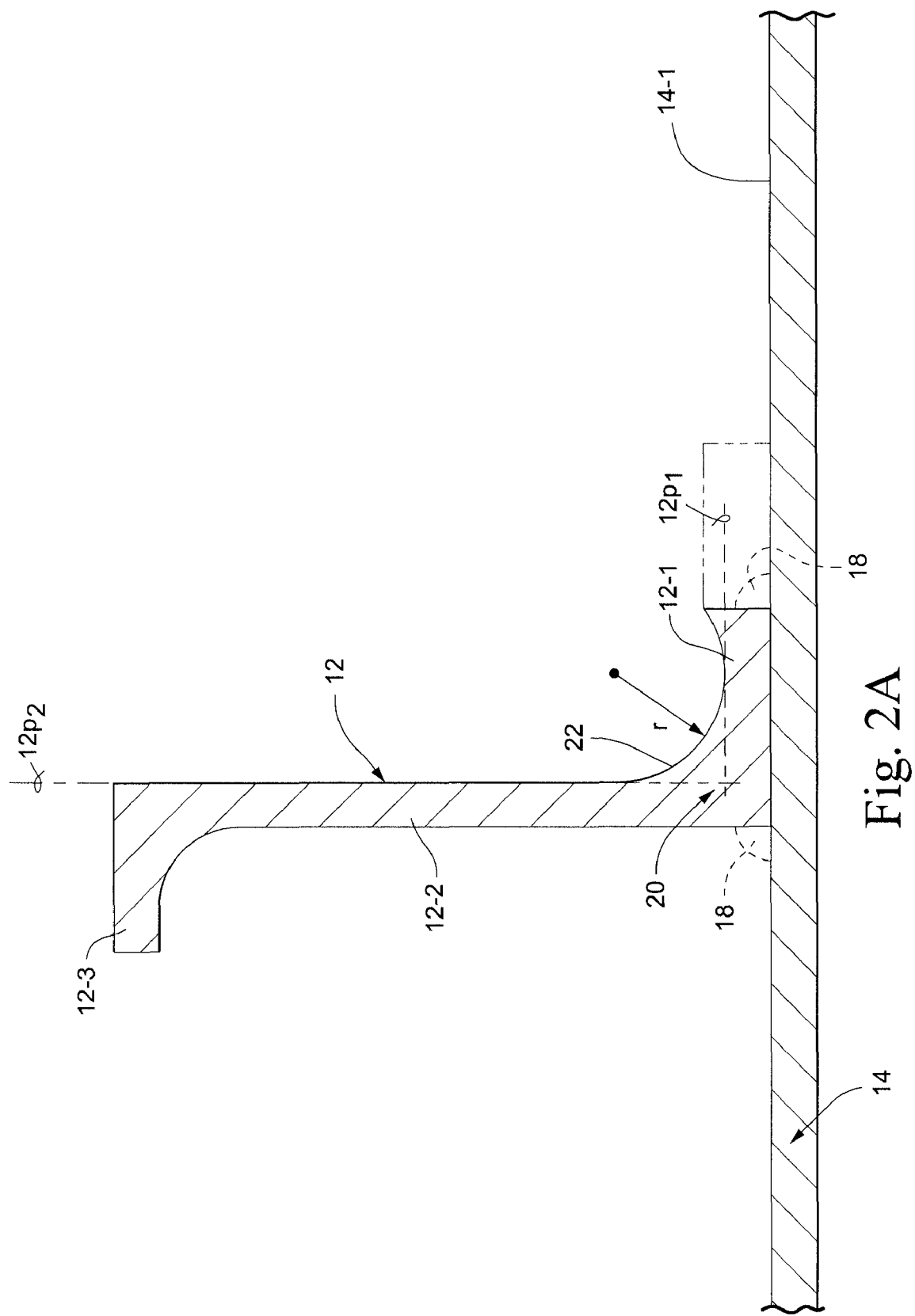
FIG. 2A through 2C are enlarged cross-sectional end views depicting the manner in which one workpiece is welded to another workpiece in accordance with an embodiment of this invention.
Figure 2B:
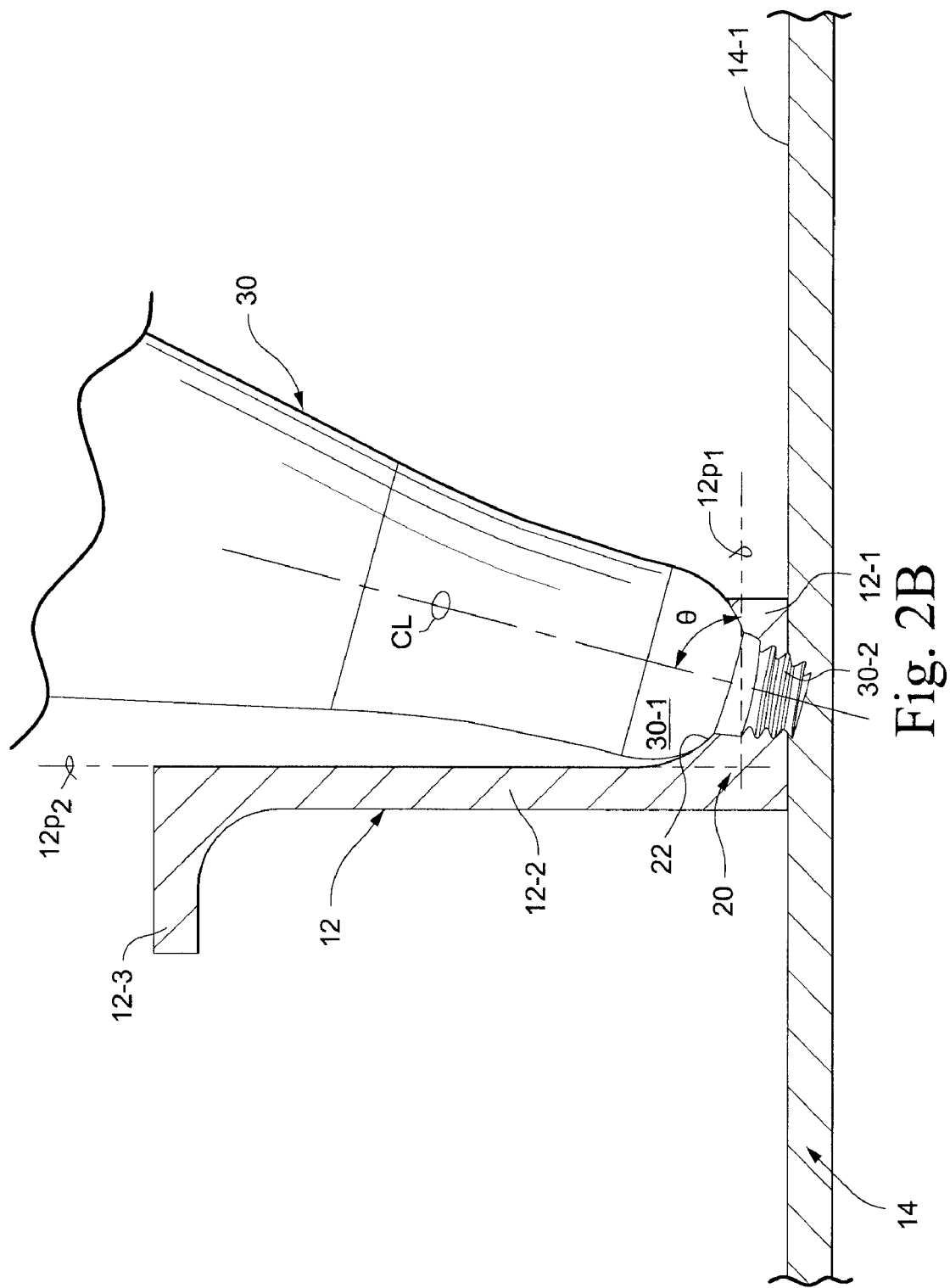
Figure 2C:
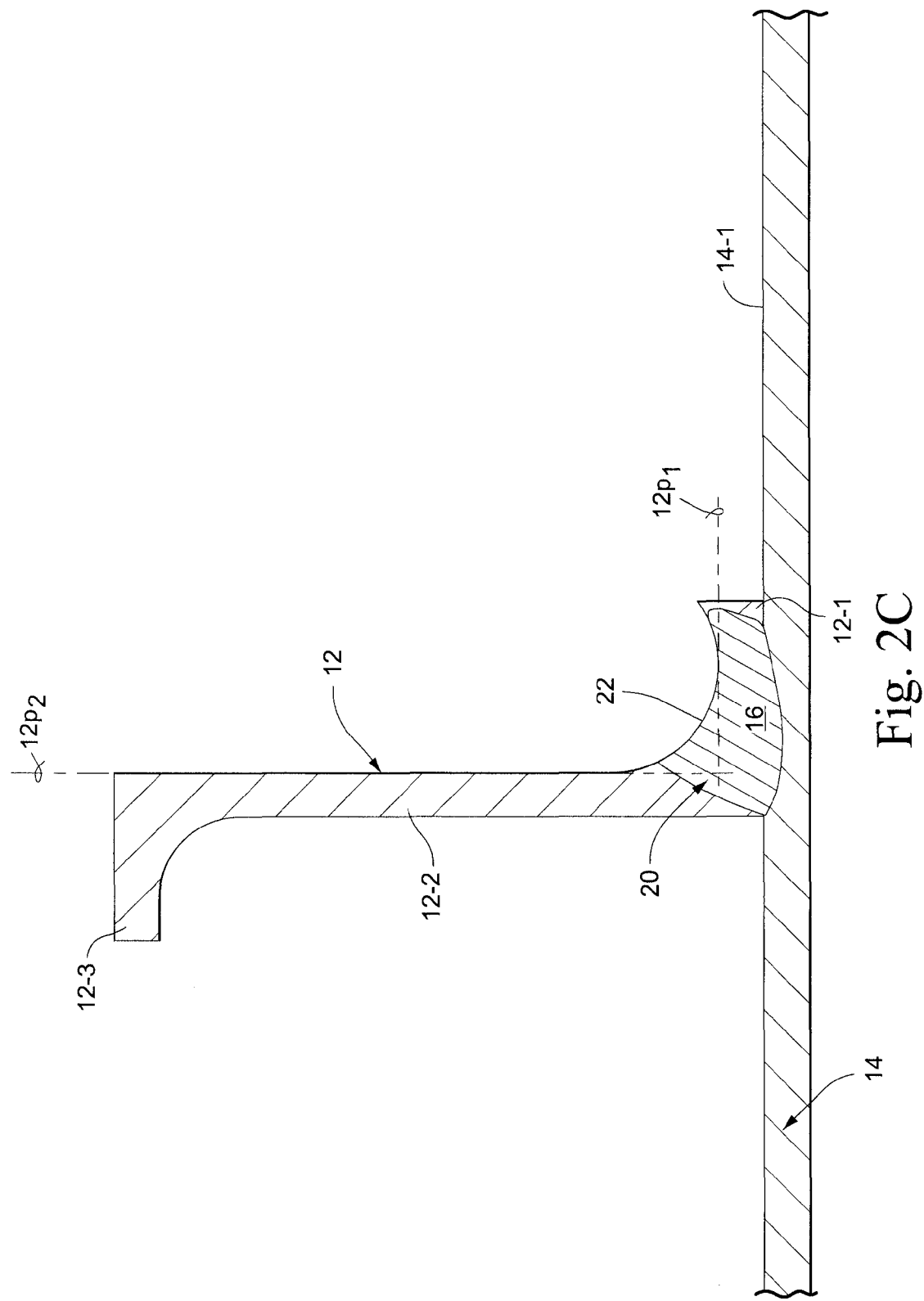

Accompanying FIGS. 2A through 2C depict in greater detail the manner in which the first and second workpieces 12, 14 are welded to one another in accordance with an embodiment of the present invention. In this regard, it will be observed that the first workpiece 12 integrally includes a lower workpiece flange 12-1 and a central workpiece web 12-2 mutually orthogonal to one another along planes $12p_1$ and $12p_2$, respectively. In the embodiment depicted, the first workpiece 12 also has an upper part 12-3. FIGS. 2A through 2C depict upper part 12-3 as a flange, but this upper part 12-3 may have other geometry, like cylindrical, square or any other.

It will of course be understood that other configurations of the first workpiece may be provided without departing from the scope of the present invention. Thus, a cross-sectional I-beam, C-beam, L-beam, U-beam, "omega"-beam, inverted T-beam and like configurations may be employed satisfactorily in the practice of the present invention.

In the exemplary embodiment depicted, the lower flange 12-1 is brought into adjacent contact with a planar surface 14-1 of the second workpiece 14. As shown, the surface 14-1 is parallel to the workpiece plane $12p_1$ and the lower flange 12-1. As shown in FIG. 2A, the flange 12-1 and workpiece surface 14-1 may include optional adhesive beads 18 (or an interface sealant) along lateral edges of the former in order to initially position the workpieces 12, 14 prior to conducting friction stir welding.

The junction region 20 between the lower flange 12-1 and the web 12-2 defined by the planes $12p_1$, $12p_2$, respectively, establishes a bearing surface 22 which in the embodiment depicted has an arcuately concave geometry, that is an arcuately concave surface of radius r as depicted in FIG. 2A. As shown in FIG. 2B, the arcuately concave geometry of the bearing surface 22 at the junction 20 thus accommodates a corresponding arcuately convex geometry of the tool shoulder 30-1 associated with a FSW tool 30. The mated accommodation of the convex tool shoulder 30-1 and the concave bearing surface 22 thereby allows the outwardly extending pin 30-2 to be oriented at an angle towards the junction 20 between the flange 12-1 and web 12-2. That is, the FSW tool 30 and the pin 30-2 extending therefrom will have a centerline CL which is oriented at an angle θ, higher than 0° and less than 90°, and preferably between about 15° to about 60°, relative to the plane $12p1$. In such a manner, therefore, as shown in FIG. 2C, the friction stir weld region 16 is formed of substantial size which encompasses a portion of the junction 20 between the planes $12p1$ and $12p2$. This allows for a substantial part of the flange 12-1 being eliminated (e.g., as shown by the chain line in FIG. 2A) as unnecessary to accommodate the tool 30 and achieve a satisfactory welding between the workpieces 12 and 14 thereby realizing a concomitant weight reduction. In addition, a much larger and hence stronger weld region 16 ensues.

Figure 3:
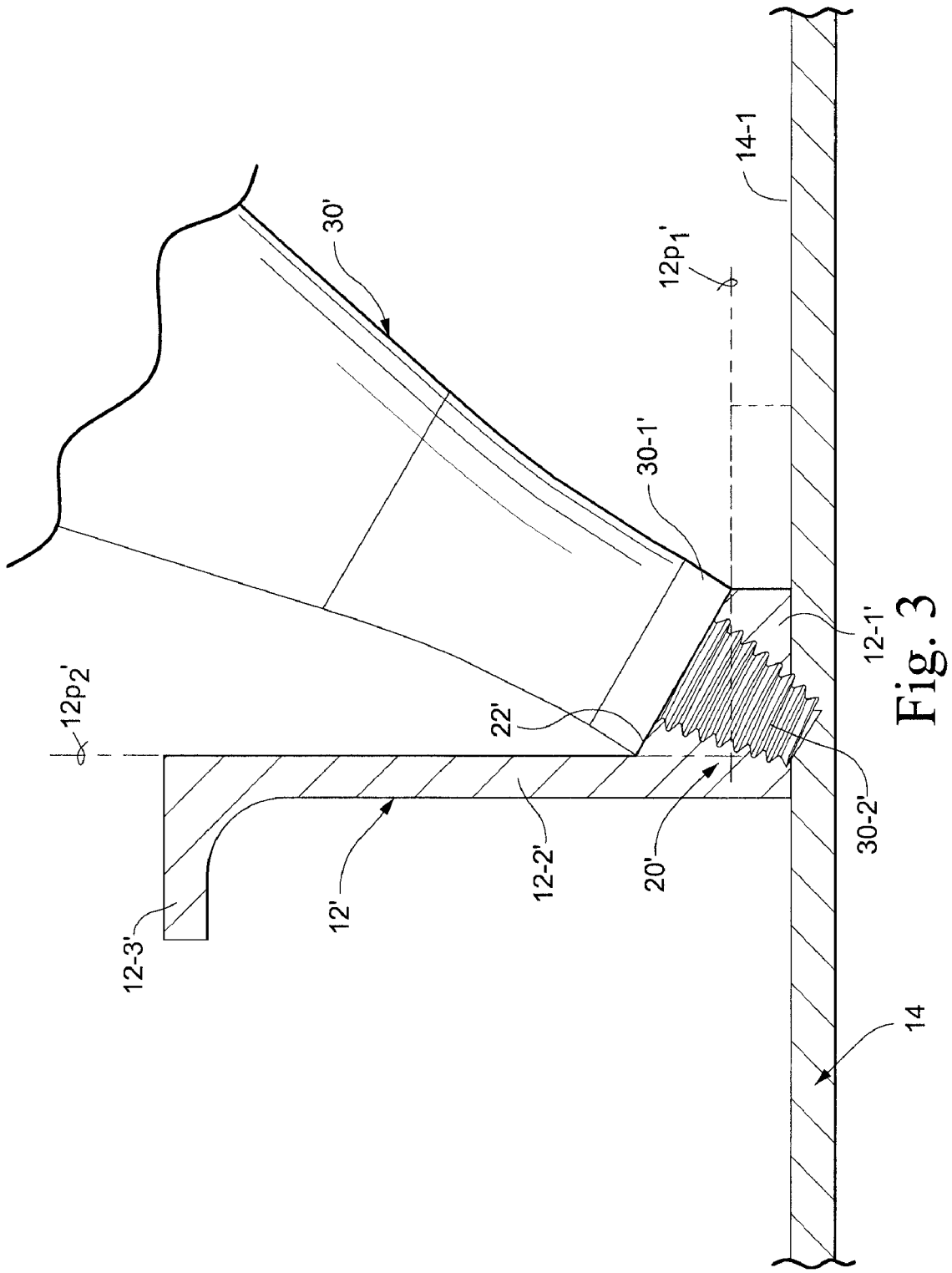
FIG. 3 is an enlarged cross-sectional end view of another embodiment of this invention for welding workpieces one to another.
Figure 4:
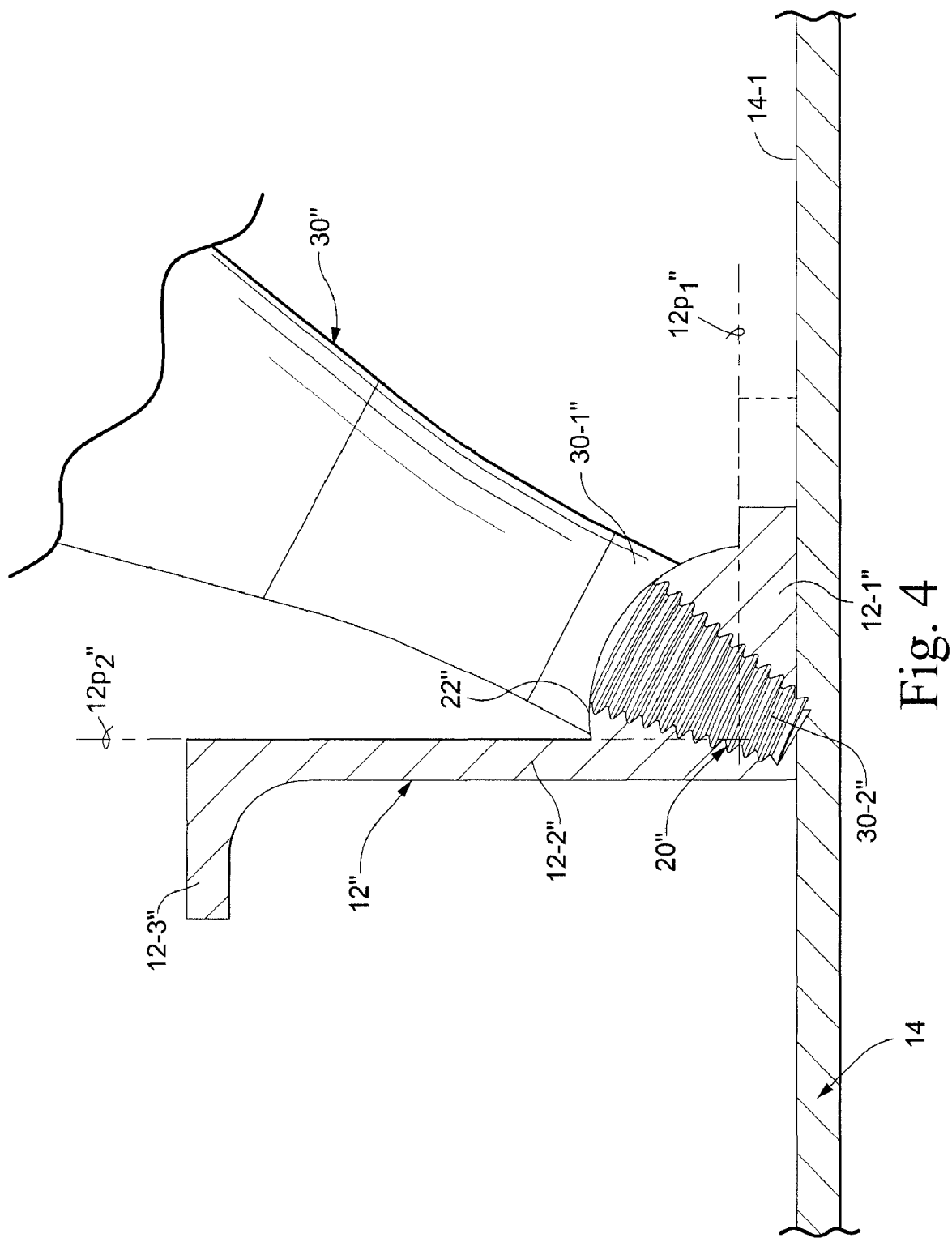
FIG. 4 is an enlarged cross-sectional end view of yet another embodiment of this invention for welding workpieces one to another.

Alternative embodiments of the present invention are depicted in FIGS. 3 and 4. In this regard, as shown in FIG. 3, the bearing surface 22' joining the web 12-2' and the flange 12-1' is in the form of a planar geometry which establishes an angle of about 45° (+/− about 15°) relative to the plane $12p_1'$.

The surface 22' is therefore conformably configured to accept the planar shoulder 30-1' of FSW tool 30' in bearing relationship therewith. In addition, it will be observed that the pin 30-2' of the tool 30' is angled relative to plane $12p_1$ so as to extend substantially through the junction of the planes $12p_1$' and $12p_2$'.

In the embodiment depicted in FIG. 4, the bearing surface 22" joining the web 12-2" and the flange 12-1" is in the form of an arcuately convex geometry that mateably conforms to the arcuately concave geometry of the shoulder 30-1" of the FSW tool 30". As in the embodiment depicted in FIG. 3, the pin 30-2" is angled relative to plane $12p_1$ so as to extend substantially through the junction 20" of the planes $12p_1$" and $12p_2$".

In each of the embodiments depicted in FIGS. 3 and 4, therefore, operation of the FSW tool 30', 30", respectively, will create a friction stir weld region (not shown in FIGS. 3 and 4) of substantial size which encompasses the junctions 20' and 20" of the planes $12p_1$', $12p_2$' and $12p_1$", $12p_2$", respectively. In such a manner, therefore, a terminal portion of the flanges 12-1' and 12-1" (shown in double chain line in FIGS. 3 and 4) may be eliminated thereby eliminating the weight associated therewith. In addition, a much larger and hence stronger weld region ensues.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of welding first and second workpieces to one another by friction stir welding (FSW) comprising the steps of:
   (a) providing a first workpiece having mutually orthogonal structural components and a junction region therebetween which defines a bearing surface having an arcuately concave geometry;
   (b) bringing one of the planar structural components of the first workpiece into adjacent contact with a surface of a second workpiece;
   (c) providing a FSW tool having a shoulder which defines an arcuately convex geometry which is conformably mateable with the arcuately concave geometry of the bearing surface, and a pin extending from the shoulder; and
   (d) welding the first and second workpieces to one another by bringing the shoulder of the FSW tool into bearing contact with the bearing surface at the junction region between the mutually orthogonal structural components of the first workpiece and advancing the pin extending from the shoulder of the FSW tool into and through the one structural component of the first workpiece at an angular orientation relative thereto so as to thereby form a friction stir weld region between the first and second workpieces.

2. The method of claim 1, wherein the pin of the FSW tool is oriented at an angle relative to a plane established by the one planar structural component of the first workpiece.

3. The method of claim 2, wherein the pin of the FSW tool is oriented at an angle higher than 0° and less than 90°.

4. The method of claim 1, further comprising providing an adhesive bead or an interface sealant which contacts at least one lateral edge of the first workpiece and a corresponding portion of the second workpiece.

5. The method of claim 4, comprising providing adhesive beads or an interface sealant which contacts opposed lateral edges of the first workpieces and corresponding portions of the second workpiece.

6. The method of claim 1, wherein the first workpiece is selected from Z-beam, I-beam, C-beam, L-beam, U-beam, "omega"-beam and inverted T-beam members.

7. A friction stir welding (FSW) system comprising:
   first and second workpieces, wherein
   the first workpiece has mutually orthogonal structural components and a junction region therebetween which defines a bearing surface having an arcuately concave geometry, and wherein
   one of the structural components of the first workpiece being adapted for adjacent contact with the second workpiece to allow for welding therebetween; and
   a FSW tool having a shoulder defining an arcuately convex geometry which is conformably geometrically mateable with the arcuately concave geometry of the bearing surface, and a pin extending from the shoulder of the FSW tool, wherein
   the shoulder of the FSW tool may be brought into bearing contact with the bearing surface at the junction region between the mutually orthogonal structural components of the first workpiece so that the pin extending therefrom may be advanced into and through the one structural component of the first workpiece at an angular orientation thereto so as to thereby form a friction stir weld region between the first and second workpieces.

8. The system of claim 7, wherein mateable shoulder of the FSW tool and the bearing surface allow for orientation of the pin at an angle relative to a plane established by the one structural component of the first workpiece.

9. The system of claim 8, wherein the shoulder and the bearing surface allow for orientation of pin at an angle higher than 0° and less than 90°.

10. The system of claim 7, wherein the first workpiece is selected from Z-beam, I-beam, C-beam, L-beam, U-beam, "omega"-beam and inverted T-beam members.

11. A method of welding first and second workpieces to one another by friction stir welding (FSW) comprising the steps of:
   (a) providing a first workpiece having mutually orthogonal structural components and a junction region therebetween which defines a bearing surface having an arcuately convex geometry;
   (b) bringing one of the planar structural components of the first workpiece into adjacent contact with a surface of a second workpiece;
   (c) providing a FSW tool with a shoulder having an arcuately concave geometry which is conformably mateable with the arcuately convex geometry of the bearing surface, and a pin extending from the shoulder; and
   (d) welding the first and second workpieces to one another by bringing the shoulder of the FSW tool into bearing contact with the bearing surface at the junction region between the mutually orthogonal structural components of the first workpiece and advancing the pin extending from the shoulder of the FSW tool into and through the one structural component of the first workpiece at an angular orientation relative thereto so as to thereby form a friction stir weld region between the first and second workpieces.

12. The method of claim 11, wherein the pin of the FSW tool is oriented at an angle relative to a plane established by the one planar structural component of the first workpiece.

13. The method of claim 12, wherein the pin of the FSW tool is oriented at an angle higher than 0° and less than 90°.

14. The method of claim 12, further comprising providing an adhesive bead or an interface sealant which contacts at least one lateral edge of the first workpiece and a corresponding portion of the second workpiece.

15. The method of claim 14, comprising providing adhesive beads or an interface sealant which contacts opposed lateral edges of the first workpieces and corresponding portions of the second workpiece.

16. The method of claim 11, wherein the first workpiece is selected from Z-beam, I-beam, C-beam, L-beam, U-beam, "omega"-beam and inverted T-beam members.

17. A friction stir welding (FSW) system comprising:
first and second workpieces, wherein
the first workpiece has mutually orthogonal structural components and a junction region therebetween which defines a bearing surface having an arcuately convex geometry, and wherein
one of the structural components of the first workpiece being adapted for adjacent contact with the second workpiece to allow for welding therebetween; and
a FSW tool having a shoulder defining an arcuately concave geometry which is conformably geometrically mateable with the arcuately convex geometry of the bearing surface, and a pin extending from the shoulder of the FSW tool, wherein
the shoulder of the FSW tool may be brought into bearing contact with the bearing surface at the junction region between the mutually orthogonal structural components of the first workpiece so that the pin extending therefrom may be advanced into and through the one structural component of the first workpiece at an angular orientation thereto so as to thereby form a friction stir weld region between the first and second workpieces.

18. The system of claim 17, wherein mateable shoulder of the FSW tool and the bearing surface allow for orientation of the pin at an angle relative to a plane established by the one structural component of the first workpiece.

19. The system of claim 18, wherein the shoulder and the bearing surface allow for orientation of pin at an angle higher than 0° and less than 90°.

20. The system of claim 17, wherein the first workpiece is selected from Z-beam, I-beam, C-beam, L-beam, U-beam, "omega"-beam and inverted T-beam members.

* * * * *